(12) United States Patent
Wang et al.

(10) Patent No.: US 9,449,236 B2
(45) Date of Patent: Sep. 20, 2016

(54) METHOD FOR OBJECT SIZE CALIBRATION TO AID VEHICLE DETECTION FOR VIDEO-BASED ON-STREET PARKING TECHNOLOGY

(71) Applicant: Xerox Corporation, Norwalk, CT (US)

(72) Inventors: Yao Rong Wang, Webster, NY (US); Orhan Bulan, Henrietta, NY (US); Hengzhou Ding, San Diego, CA (US); Graham S. Pennington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 383 days.

(21) Appl. No.: 14/070,812

(22) Filed: Nov. 4, 2013

(65) Prior Publication Data

US 2015/0124093 A1    May 7, 2015

(51) Int. Cl.
*H04N 7/18* (2006.01)
*G06K 9/00* (2006.01)
*G08G 1/14* (2006.01)
*G08G 1/16* (2006.01)

(52) U.S. Cl.
CPC ....... *G06K 9/00812* (2013.01); *G06K 9/00771* (2013.01); *G08G 1/141* (2013.01); *G08G 1/168* (2013.01)

(58) Field of Classification Search
CPC .... B60R 1/00; B60R 2300/105; H04N 7/181
USPC ......................................................... 348/148
See application file for complete search history.

(56) References Cited

U.S. PATENT DOCUMENTS

| | | | | |
|---|---|---|---|---|
| 2003/0074129 | A1* | 4/2003 | Curbow | G01C 21/26 701/523 |
| 2006/0220911 | A1* | 10/2006 | Jaupitre | G08G 1/14 340/932.2 |
| 2008/0215202 | A1* | 9/2008 | Breed | G01C 21/3611 701/25 |
| 2009/0243888 | A1* | 10/2009 | Kawabata | G08G 1/166 340/932.2 |
| 2013/0265419 | A1 | 10/2013 | Bulan et al. | |

* cited by examiner

*Primary Examiner* — Chikaodili E Anyikire
(74) *Attorney, Agent, or Firm* — Fay Sharpe LLP

(57) ABSTRACT

A method for determining parking availability includes receiving video data from a sequence of frames taken from an image capture device monitoring a parking area. The method includes detecting at least one object located in the parking area. The method includes determining boundaries of the parking area. The boundaries include at least an inner boundary relative to the image capture device and an outer boundary relative to the image capture device. The outer boundary is substantially parallel to the inner boundary. The method further includes computing a length of at least one of the object and a space between objects using an object pixel for each of the inner and outer boundaries. Using the computed length, The method includes determining a parking availability in the parking area. The method includes outputting a notice of the parking availability to a user.

20 Claims, 8 Drawing Sheets

METHOD FOR OBJECT SIZE CALIBRATION TO AID VEHICLE DETECTION FOR VIDEO-BASED ON-STREET PARKING TECHNOLOGY

BACKGROUND

The present disclosure relates to a video-based method and system for determining a length of an available parking space at a given instant in time. The disclosure finds application in parking space management. However, the embodiments are also amendable to other like applications.

One challenge associated with on-street parking is an accurate detection of available spaces made by drivers and/or parking managers. Conventional methods for detecting vehicle occupancy in parking spaces include sensor-based solutions, such as "puck-style" sensors and ultrasonic ceiling or in-ground sensors. These sensors are costly to install and maintain. Because the sensors are located directly in the parking region, parking availability may be reduced during service work.

Non-stereoscopic video cameras have also been proposed to monitor on-street parking. Like the in-ground sensor technology, the early proposal of video camera technology was designed for, and limited to, monitoring a single-space parking configuration known as stall-based parking, where painted lines typically demark a defined parking space for a single vehicle. However, on-street parking can be provided in a multi-space configuration, where a long section of street is designated as a parking area to accommodate multiple vehicles parked along any portion of the parking area. An extension of the video camera technology for use in multi-space, on-street parking occupancy detection is recently being developed, and the present disclosure is a part of this technology development.

Multi-space parking configurations are advantageous over single space configurations because they require easier maintenance and lower costs. The application of sensor-based methods in multi-space parking environments is conceptually difficult and expensive to implement. Given a comparatively lower cost of a video surveillance, a video-based solution offers better value when incorporated into a parking management scheme. One video camera located near the parking region can monitor and track several parking spots. Additionally, maintenance of the video cameras is likely to be less disruptive to street traffic than maintenance of in-ground sensors.

Co-pending and commonly assigned application U.S. Publication No. 2013/0265419, entitled "A System And Method For Available Parking Space Estimation For MultiSpace On-Street Parking", filed Apr. 6, 2012, introduced a video-based method operable to analyze frames in a video feed for estimating whether a parking space that appears available can actually fit a vehicle. Because a camera can have a viewing angle with respect to the parking street that varies from one street to another, U.S. Ser. No. 13/441,269 applied a side detection operation for detecting a vehicle from a side of the vehicle. Because objects with similar physical sizes can appear as different sizes on the image plane, depending on their positions relative to the image capture device, the computed length of an object can vary depending on its location in the parking region. FIG. 1 shows an example scenario where two sedans of similar size are parked in a parking lane. It clearly shows the variation of vehicle size as a function of the vehicle's distance from the image capture device. FIG. 2 shows the example detection in the PRIOR ART where the vehicles appear as different sized objects on the image plane. The objects located farther from the image capture device become smaller in appearance, and therefore are susceptible to noise. These vehicles may be mistaken as non-vehicle objects and/or occlusions in the known vehicle detection process.

The previously introduced video-based operation does not account for effects of object location on the image plane. An improved method is needed which resizes spatial information to aid vehicle and parking space detection in an on-street parking environment.

INCORPORATION BY REFERENCE

The disclosure of co-pending and commonly assigned U.S. Published Application No. 2013/0265419, entitled, "A System And Method For Available Parking Space Estimation For MultiSpace On-Street Parking", by Orhan Bulan, et al., is totally incorporated herein by reference.

BRIEF DESCRIPTION

The present disclosure performs a spatial calibration operation to aid in the detection and/or classification of objects in video processing. Using video-based on-street parking technology, the spatial calibration is performed to map a pixel distance in the captured video frame to an actual (world) distance. This computed distance is used to determine a length of and/or verify an availability of a parking space between two parked vehicles on the street.

A first embodiment of the disclosure relates to a method for determining parking availability. The method includes receiving video data from a sequence of frames taken from an image capture device monitoring a parking area. The method includes detecting at least one object located in the parking area. The method includes determining boundaries of the parking area. The boundaries include at least an inner boundary relative to the image capture device and an outer boundary relative to the image capture device. The outer boundary is substantially parallel to the inner boundary. The method further includes computing a length of at least one of the object and a space between objects using an object pixel for each of the inner and outer boundaries. Using the computed length, the method includes determining a parking availability in the parking area. The method includes outputting a notice of the parking availability to a user.

Another embodiment of the disclosure relates to a system for determining parking availability. The system includes a parking space determination device. The parking space determination device includes a memory that stores a number of modules and a processor that executes the modules. A video buffer module is operable to receive video data from a sequence of frames capturing a parking area. A vehicle detection module is operable to detect at least one object located in the parking area. A length calculation module is operable to determine boundaries of the parking area. The boundaries include at least an inner boundary relative to an image capture device and an outer boundary relative to the image capture device. The outer boundary is substantially parallel to the inner boundary. The length calculation module is further operable to compute a length of at least one of the object and a space between objects using an object pixel for each of the inner and outer boundaries. A parking determination module is operable to determine a parking availability in the parking area using the computed length. And a communication interface is operable to transmit a notice of the parking availability to a user.

DETAILED DESCRIPTION

The present disclosure relates to a video-based method and system for determining the size of a vehicle occupying a multi-space parking region at a given instant in time for purposes of determining an availability of additional parking. Performing a similar operation toward the same purpose, the disclosure can also determine the length of an available parking space between two vehicles at a given instant in time. The system includes an image capture device that monitors parking spaces and processes video data, or transmits the video data to a central processor, for determining an availability of the parking spaces based on distance computations.

Figure 1:
FIG. 1 shows an example scenario where multiple cars vehicles are parked along an on-street parking environment.
Figure 2:
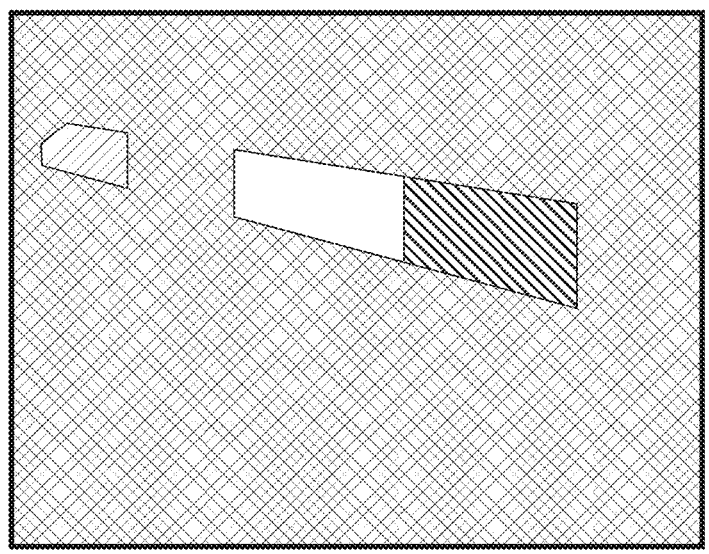
FIG. 2 show an example binary image generated in the PRIOR ART using a known vehicle detection process.
Figure 3:
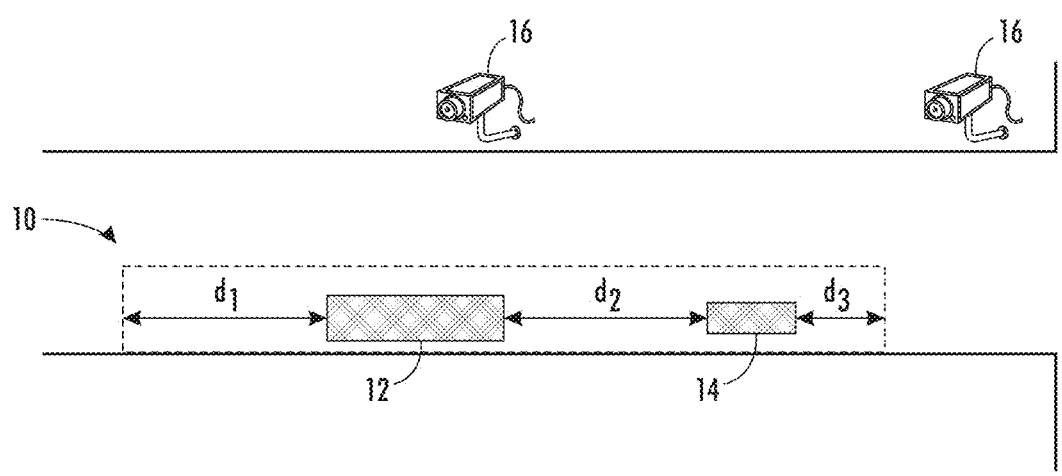
FIG. 3 shows an example scenario where the present disclosure can be applied to determine spaces.

FIG. 3 shows an example scenario where the present disclosure can be applied to determine spaces. A multi-space parking area 10 is shown in phantom as not including any marked lines that designate separate parking stalls. A truck 12 and a vehicle 14 are parked in the area 10 that is being monitored by at least one image capture device 16. The number of devices 16 that are deployed to cover the parking area 10 can vary depending on the size of the parking area. The captured video data is simultaneously transferred to the determination device 102 (FIG. 4), or a similar performing central processor, which calculates and reports the lengths ($d_1$, $d_2$ and $d_3$) of the available parking spaces to interested parties.

Figure 4:
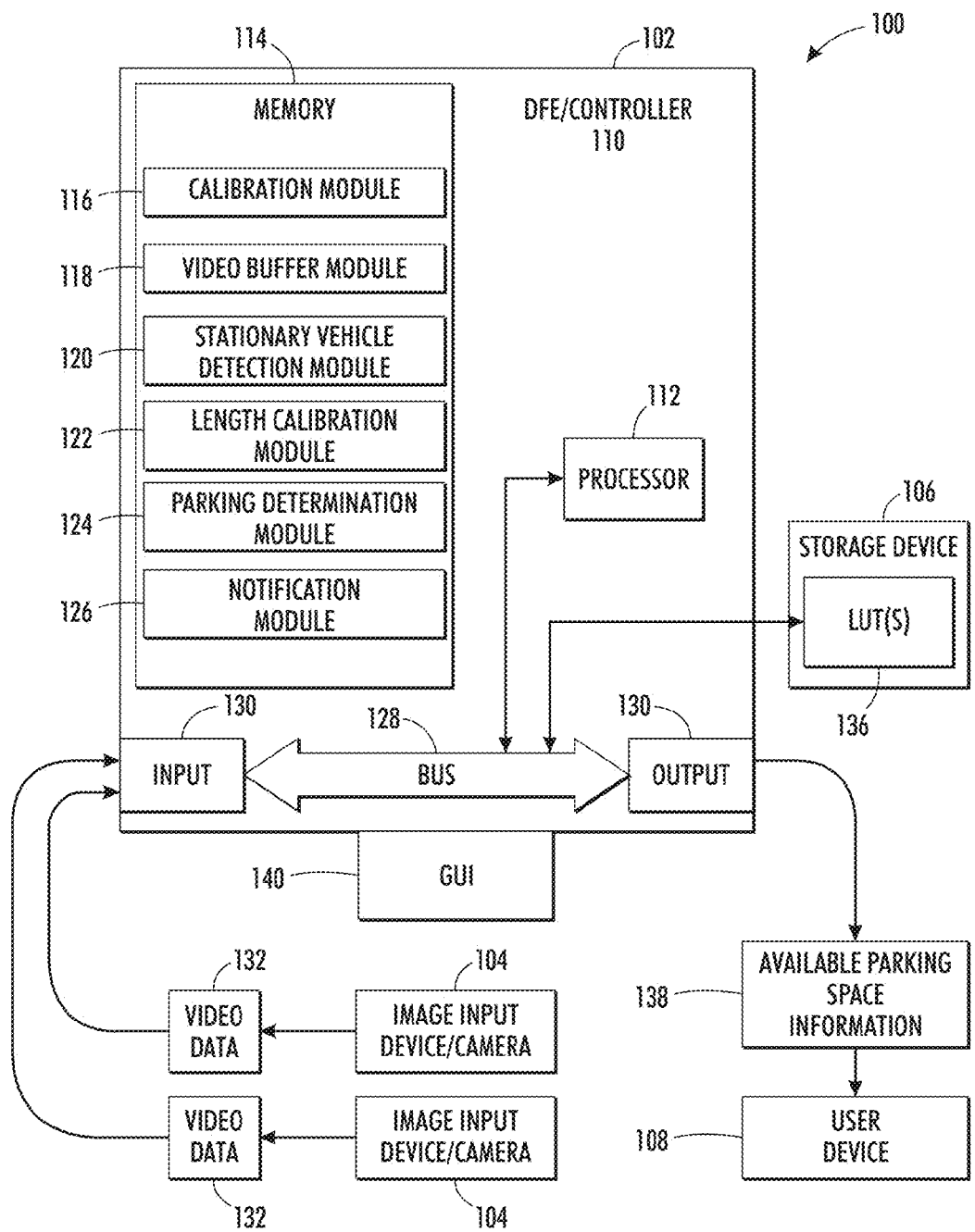
FIG. 4 is a schematic illustration of a parking space determination system according to one embodiment.

FIG. 4 is a schematic illustration of a parking space determination system 100 in one exemplary embodiment. The system includes a parking space determination device 102 ("determination device"), an image capture device 104, and a storage device 106, which may be linked together by communication links, referred to herein as a network. In one embodiment, the system 100 may be in further communication with a user device 108. These components are described in greater detail below.

The determination device 102 illustrated in FIG. 4 includes a controller 110 that is part of or associated with the determination device 102. The exemplary controller 110 is adapted for controlling an analysis of video data received by the system 100 by classifying the pixels in each static frame. The controller 110 includes a processor 112, which controls the overall operation of the determination device 102 by execution of processing instructions that are stored in memory 114 connected to the processor 112.

The memory 114 may represent any type of tangible computer readable medium such as random access memory (RAM), read only memory (ROM), magnetic disk or tape, optical disk, flash memory, or holographic memory. In one embodiment, the memory 114 comprises a combination of random access memory and read only memory. The digital processor 112 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 102, executes instructions stored in memory 114 for performing the parts of the method outlined in FIGS. 5, 6 and 8. In some embodiments, the processor 112 and memory 114 may be combined in a single chip.

The determination device 102 may be embodied in a networked device, such as the image capture device 104, although it is also contemplated that the determination device 102 may be located elsewhere on a network to which the system 100 is connected, such as on a central server, a networked computer, or the like, or distributed throughout the network or otherwise accessible thereto. The video data analysis and parking space determination phases disclosed herein are performed by the processor 112 according to the instructions contained in the memory 114. In particular, the memory 114 stores a calibration module 116, which generates Look Up Tables for mapping the pixel coordinates on an image plane to actual coordinates in the parking region; a video buffer module 118, which captures video data of a parking area of interest; a stationary vehicle detection module 120, which detects vehicles that are in the parking area of interest; a length calculation module 122, which calculates the actual distance between the parked vehicles and/or a length of a parked vehicle occupying a portion of the parking region; a parking determination module 124, which determines availability of a parking space for a vehicle entering a scene; and, a notification module 126, which notifies a user of the available parking space. Embodiments are contemplated wherein these instructions can be stored in a single module or as multiple modules embodied in the different devices. The modules 116-126 will be later described with reference to the exemplary method.

The software modules as used herein, are intended to encompass any collection or set of instructions executable by the determination device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the determination device 102 may be all connected by a bus 128.

With continued reference to FIG. 4, the determination device 102 also includes one or more communication interfaces 130, such as network interfaces, for communicating with external devices. The communication interfaces 130 may include, for example, a modem, a router, a cable, and and/or Ethernet port, etc. The communication interfaces 130 are adapted to receive video and/or video data 132 as input.

The determination device 102 may include one or more special purpose or general purpose computing devices, such as a server computer or digital front end (DFE), or any other computing device capable of executing instructions for performing the exemplary method.

FIG. 4 further illustrates the determination device 102 connected to an image source 104 for inputting and/or receiving the video data and/or image data (hereinafter collectively referred to as "video data") in electronic format. The image source 104 may include an image capture device, such as a camera. The image source 104 can include one or more surveillance cameras that capture video data from the parking area of interest. For performing the method at night in parking areas without external sources of illumination, the cameras 104 can include near infrared (NIR) capabilities at the low-end portion of a near-infrared spectrum (700 nm-1000 nm).

In one embodiment, the image source 104 can be a device adapted to relay and/or transmit the video captured by the camera to the determination device 102. For example, the image source 104 can include a scanner, a computer, or the like. In another embodiment, the video data 132 may be input from any suitable source, such as a workstation, a database, a memory storage device, such as a disk, or the like. The image source 104 is in communication with the controller 110 containing the processor 112 and memories 114.

With continued reference to FIG. 4, the system 100 includes a storage device 106 that is part of or in communication with the determination device 102. In a contemplated embodiment, the determination device 102 can be in communication with a server (not shown) that includes a processing device and memory, such as storage device 106, or has access to a storage device 106, for storing look-up tables (LUTs) that map pixel data to actual distance data and select vehicle class and length data to actual distance data. The storage device 106 includes a repository, which stores at least two LUTs 136, such as a conversion table for each particular camera used by the system 100 and a table associating vehicle lengths with vehicle classes.

With continued reference to FIG. 4, the video data 132 undergoes processing by the determination device 102 to output a determination 138 regarding parking space availability to an operator in a suitable form on a graphic user interface (GUI) 140 or to a user device 108, such as a smart phone belonging to a driver in transit or to vehicle computer and/or GPS system, that is in communication with the determination device 102. The GUI 140 can include a display, for displaying information, such as the parking space availability and dimension, to users, and a user input device, such as a keyboard or touch or writable screen, for receiving instructions as input, and/or a cursor control device, such as a mouse, trackball, or the like, for communicating user input information and command selections to the processor 112.

Figure 5:
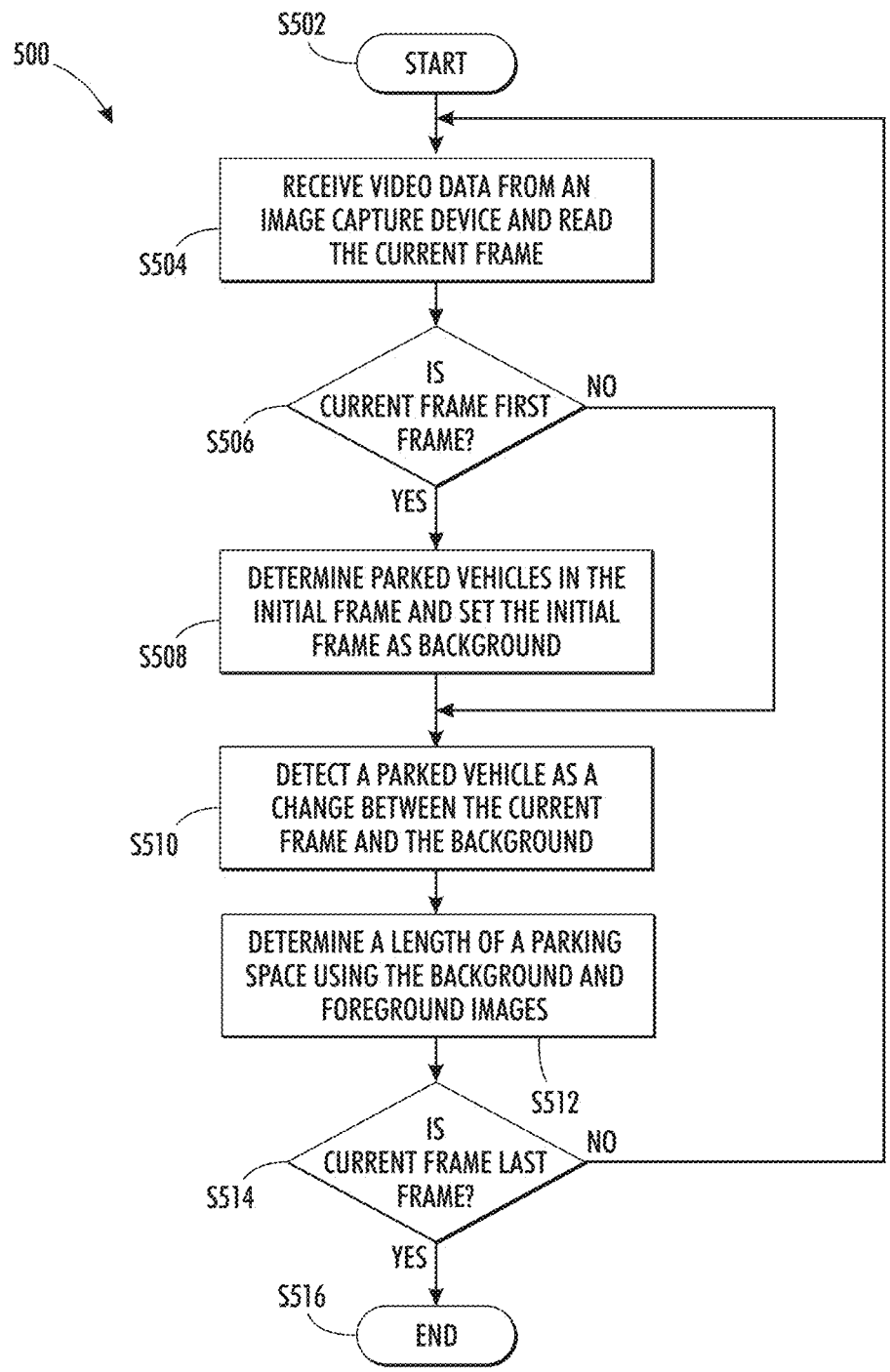
FIG. 5 is a flowchart describing an overview of a method for determining an available parking space.

FIG. 5 is a flow-chart describing an overview of the methods 500 performed by the system 100 discussed above. The method 500 starts at S502. The video buffer module 118 receives video data from a sequence of frames taken from the image capture device 104 monitoring a parking area at S504. A vehicle detection module 120 determines whether the current frame is the first frame at S506. In response to the current frame being the first frame in the sequence (YES at S506), the module 120 determines parked vehicles in the initial frame and sets the initial frame as a background at S508 for a background estimation operation. In response to the current frame not being the first frame in the sequence (NO at S506), the module 120 transmits the video data to the stationary vehicle detection module 120 for detecting an object, such as a parked vehicle, in the monitored parking region. This detection at S510 is described later as a change between the current frame and the background. The length calculation module 122 determines a length of a vehicle located in the parking region, and/or it determines the length of a parking space between two vehicles using the determined background and foreground images at S512. The system then determines whether the current frame is the last frame at S514. In response to the current frame not being the last frame in the sequence (NO at S514), the method returns to S504 to repeat the above-described process on the next frame. In response to the current frame being the last frame in the sequence (YES at S514), the method ends at S516.

As mentioned, co-pending application U.S. Ser. No. 13/441,269 introduced a video-based method operable to analyze frames in a video feed for estimating a length of a parking space for receiving a select vehicle. Because spaced apart objects, with similar physical sizes, can appear as different sizes on the image plane, depending on their positions relative to the image capture device, the computed length of an object can vary depending on its location in the parking region. The present disclosure resizes spatial information to aid vehicle and parking space detection in an on-street parking environment. Therefore, as part of a pre-processing operation, a calibration module 116 is used to generate at least one LUT for purposes resizing the object on the image plane.

Figure 6:
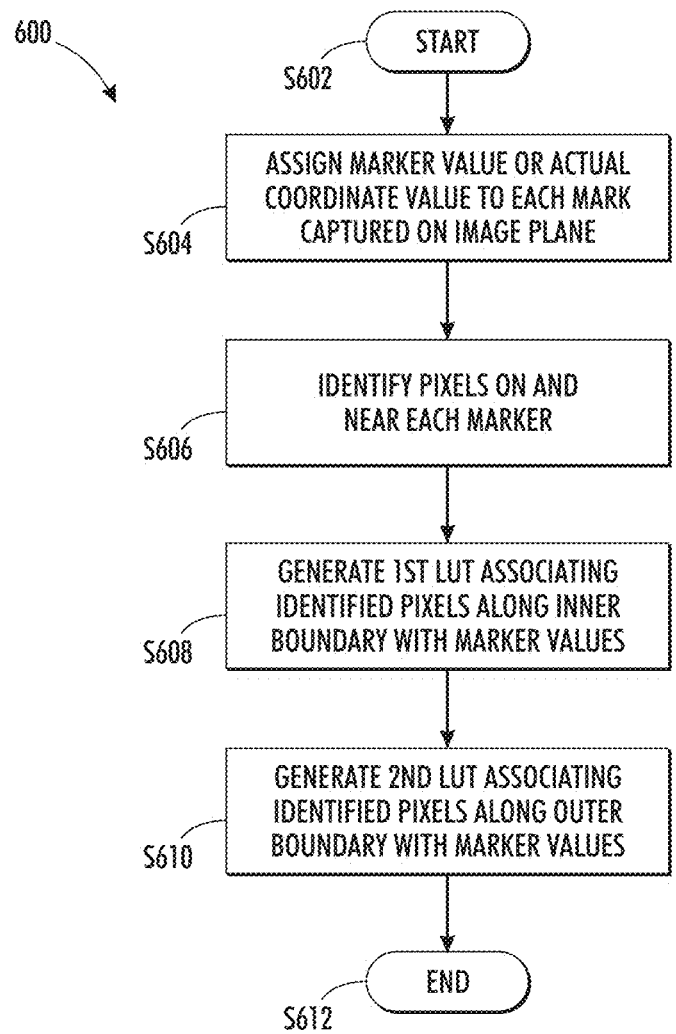
FIG. 6 is a flowchart describing an overview of a method for determining an available parking space.
Figure 7:
FIG. 7 shows tapes captured in the calibration operation.

FIG. 6 is a detailed flowchart describing the calibration method 600. The method starts at S600. Before detecting an object, the calibration module 116 receives video data capturing markings defining actual boundaries in the parking area at S602. In one embodiment, the markings were applied with a calibration tape, although contemplated embodiments are not limited to any one material. Generally, the markings are made from materials with clear contrast seen from the camera including paint and chalk, etc. The distance between the markings is fixed and is determined by the requirements of the parking occupancy detection system as well as the camera set-up and geometry. FIG. 7 shows an example of marks represented by calibration tapes used for the video processing. In the illustrated embodiment, the marks are white for enhancing their visibility on the image plane against a dark pavement. The distance between the marks in the illustrated example is 2 feet.

The calibration tapes create a first set of inner marks 72 and a second set of outer marks 74 relative to a position of the image capture device (represented generally in the non-parking region as "D"). In the illustrated example, the markings extend along opposite edges defining the parking area 70. In this example, the parking area is a parking lane running adjacent a driving lane 76. Accordingly, the inner and outer markings run along the longitudinal extent of the lane. However, embodiments are contemplated where calibration tape is applied and captured in a parking region having a different profile. FIG. 7 illustrates each mark of the inner set 70 corresponding with a mark of the outer set 72 such that the sets are oriented in substantially parallel relationship.

The marks are equally spaced apart and the spacing between marks of the inner set 70 is equal to the spacing of the outer set 72. In the illustrated embodiment, the distance between two marks represented by the calibration tape is two feet. However, any distance may be selected as long as it is recorded. The known distance is used to correct the size (i.e., unknown measurement) later captured with the image capture device.

Returning to FIG. 6, the module 116 maps the actual (xy) coordinates of each marking onto the image plane at S602. In one embodiment, each mark captured on the image plane can be assigned a number ("marker value") instead of an actual coordinate at 604. For example, for the inner set, each marker can be sequentially associated with a marker value from 1-n. In other words, the inner marker that is closest to the image capture device can be assigned a marker value of "1", the next marker "2", and so on moving away from the image capture device in the image. Similarly, each marker in the outer set is assigned a marker value starting at 1 and ending at n as the markers move away from the image. In another embodiment, the leftmost inner marker can be assigned a marker value of "1", the next marker "2", and so on moving toward the right of the image. Similarly, each marker in the outer set is assigned a marker value starting at 1 and ending at n as the markers are located from left to right.

The pixels falling on the markers are identified and associated with the number value (or actual coordinate value) previously assigned to the marker at 606. In one embodiment, the pixels in proximity of each marker are also identified and associated with a number value previously assigned to the marker, or, in one embodiment, a number value plus a fraction. For example, a pixel between two markers may be assigned the value n.5.

Using this information, the calibration module 116 generates two LUTs ($LUT_{inner}$, and $LUT_{outer}$), including a first $LUT_{inner}$, for mapping pixels identified along the inner boundary on the image plane in the later captured sequence of frames with the corresponding marker value at 608. Similarly, the calibration module 116 generates a second LUT $LUT_{outer}$ for mapping pixels identified along the outer boundary on the image plane in the later captured sequence of frames at S610. The system 100 receives video data for detecting vehicles without the calibration tape. In other words, after the calibration is complete, the calibration tape is removed from the actual scene before the vehicle detection operation is performed. The method ends at S612. In another embodiment, it is envisioned that calibration tape can be applied to a surface at a scene that is not the same as the scene later monitored for vehicle detection. Rather, an image capture device can be placed in another environment to capture calibration tape that outlines a same sized boundary, at a same camera perspective, as the scene to be monitored.

Figure 8:
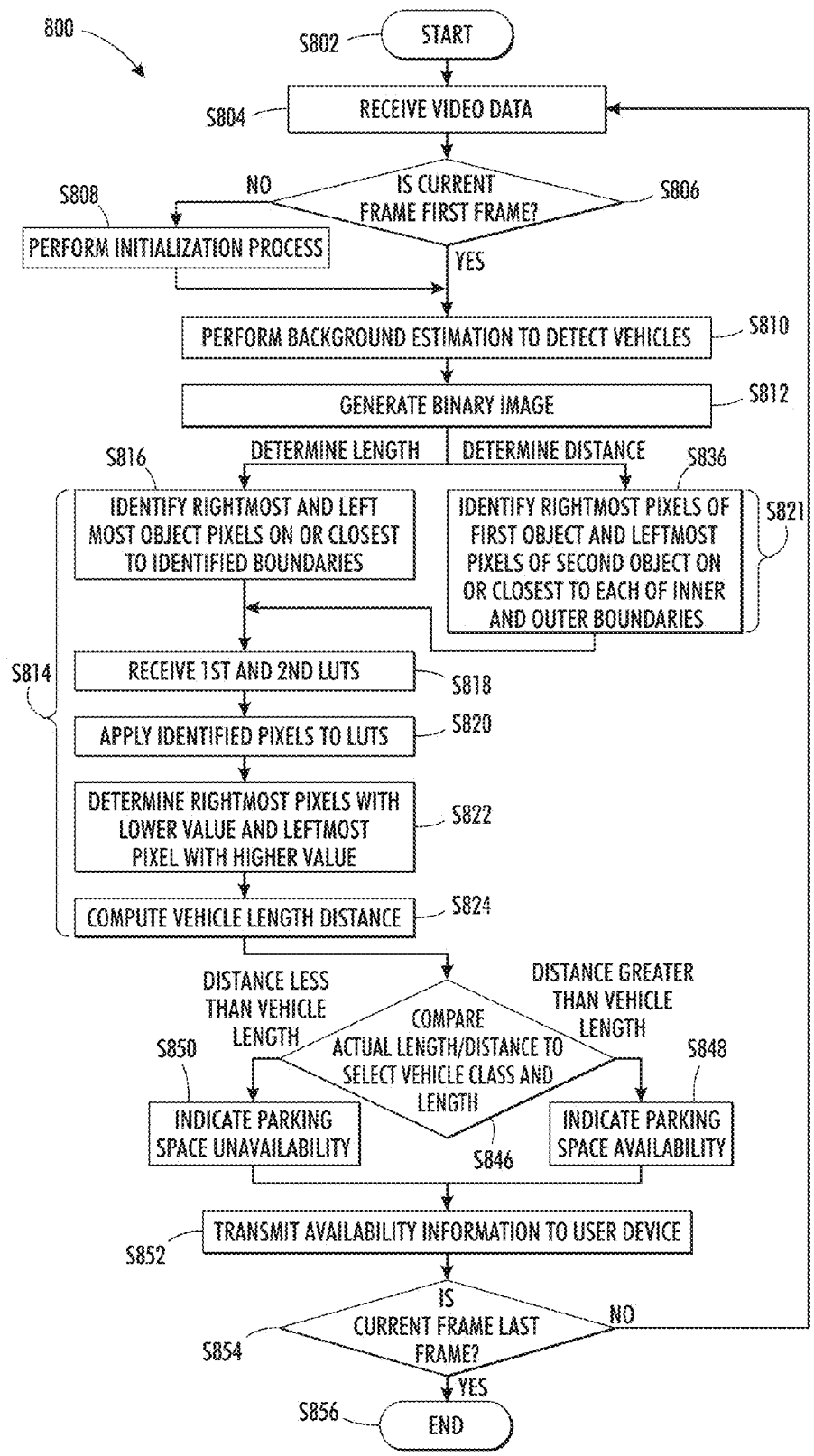
FIG. 8 is a flowchart describing a process for determining a length of the parking space.

The calibration operation enables the system 100 to map length of an object or between objects in a video frame to an actual (world) length or distance. One example of using this information is to estimate the real life size of the detected objects in video processing and then to set up a threshold for object classification based on the object's actual size. FIG. 8 describes a method for performing this detection and classification in detail.

FIG. 8 is a detailed flowchart describing the method 800 for determining a status, i.e., availability, of space in a multi-space parking region. The method starts at S802. The video buffer module 118 receives video data from a sequence of frames taken from the image capture device 104 at S804. The vehicle detection module 120 determines whether the current frame is the first frame at S806. In response to the current frame not being the first frame in the sequence (NO at S806), the module 120 transmits the video data to the stationary vehicle detection module 120 for performing vehicle detection at S810. In response to the current frame being the first frame in the sequence (YES at S806), the module 120 performs an initialization process at S808 by detecting a parked vehicle in the frame and setting the first frame as a background. The initialization process can be performed at the start of the video feed or at a later frame. However, the initialization process can be performed at a different module, such as an initialization module (not shown), and the vehicle detection module and other modules can follow the initialization module.

The initialization process is described in co-pending and commonly assigned application U.S. Publication No. 2013/0265419, entitled "A System And Method For Available Parking Space Estimation For MultiSpace On-Street Parking", filed Apr. 6, 2012, the contents of which are fully incorporated herein. The initialization process estimates vehicle occupancy in the parking area at a start of the sequence using a static image captured in the initial frame. Generally, the initialization process determines the positions of the parked vehicles in the initial frame to detect objects and/or vehicles that are already present in the parking area.

The stationary vehicle detection module 120 detects vehicles that park in the parking area or leave the parking area at S810 in subsequent frames. Generally, the stationary vehicle detection module 120 highlights objects in the foreground, i.e., in the parking area of interest, of a video sequence when the image capture device is used to capture the video data. Once the background is estimated, the vehicles that park in the parking area or leave the parking area, after the initialization process at S808, are detected by subtracting the selected frame from the estimated background and applying thresholding and/or morphological operations on the difference image. At each frame, the stationary vehicle detection module 120 detects movement of vehicles using temporal difference methods to check whether the detected vehicle is stationary or in motion. U.S. Ser. No. 13/441,269, the content of which is fully incorporated herein, describes a background estimation (and alternative) process(es) for vehicle detection. The background estimation process described in U.S. Ser. No. 13/441,269 classifies objects and/or vehicles based on the difference in intensity between frames.

With continued reference to FIG. 8, after the detected pixels in a select frame are classified as belonging to an object or vehicle, the stationary vehicle detection module 120 uses the pixel classifications to assign values to each pixel and then uses the assigned values to generate a binary image representing the current frame at S812. The system uses the binary information for updating the background in each next frame of the sequence. The updated background is used by the system to determine when the initially parked vehicle subsequently moves away from and/or leaves the parking space, or when a new vehicle enters the scene.

The system can update the background, frame-by-frame, for each frame that follows the initial frame of the sequence. U.S. Ser. No. 13/441,269, fully incorporated herein, describes an updating process that uses an updating factor p (i.e., a learning factor) to compute the background of a current frame. The binary image is used as input for determining an updating factor p for each pixel.

Simultaneous to the background being updated, the length calculation module 122 uses the binary image to determine the size of the detected object and/or vehicle and/or a distance (i.e., available space) between two detected vehicles located in the parking area at the time instant when the current frame is captured. As mentioned supra, there are sometimes uneven distances left between parked vehicles and the ends of a parking area. Some distances are shorter than a vehicle-length, thus making a parking space unavailable despite the appearance of it being available. Similarly, some distances are greater than a vehicle-length, thus making the parking space available for select vehicles having and/or satisfying the particular length. One aspect of the disclosure is that it distinguishes between the two for reliably indicating the availability of a parking space to a user seeking the space.

Figure 9:
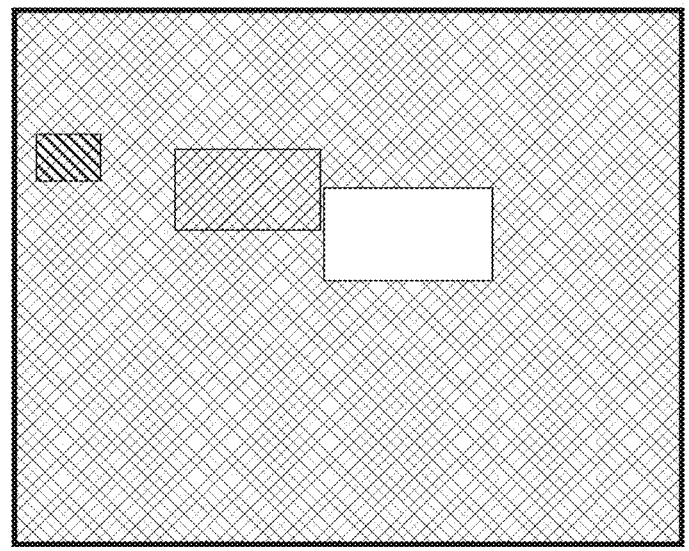
FIG. 9 shows an example of a re-sized binary image for the three vehicles of FIG. 1 after resizing the spatial information.

Continuing with FIG. 8, using the binary image generated at S812, the length calculation module 122 estimates an actual length (and/or depth) of the available parking space. In one embodiment, the module 126 determines the length of an element in the foreground image, such as the stationary vehicle, and another element in the foreground image, such as an adjacent stationary vehicle or the end of the parking area at S814. To illustrate this operation, FIG. 9 shows an example binary image including three vehicles represented in the captured image of FIG. 10 and identified by background subtraction. To determine the length of each object "A, B, and C", for example, the module 126 identifies pixels on or closest to the identified boundaries at S816. The module 126 identifies a first leftmost pixel ($P_{L-O}$) of the object on the image plane on or closest to the outer boundary (known by the module from the calibration operation). The module 126 identifies a first leftmost pixel ($P_{L-I}$) of the object on the image plane on or closest to the inner boundary. The module 126 identifies a first rightmost pixel ($P_{R-O}$) of the object on the image plane on or closest to the outer boundary. The module 126 identifies a first rightmost pixel ($P_{R-I}$) of the object on the image plane on or closest to the inner boundary.

The module 126 receives the first and second $LUT_{inner}$, $LUT_{outer}$ from the storage device at S818. The module 126 applies the identified pixels to the LUTs at S820. The module 126 applies the leftmost and rightmost pixels ($P_{L-I}$), ($P_{R-I}$) of the inner boundary to the first inner boundary $LUT_{inner}$ as input, and the LUT outputs the assigned mark value. The module 126 applies the identified leftmost and rightmost pixels ($P_{L-O}$),($P_{R-O}$) of the outer boundary to the second outer boundary $LUT_{outer}$ as input to generate the assigned mark value as output. Using the LUTs, the module 126 determines which of the rightmost identified pixels has the lower mark value ($min(LUT_{inner}(P_r), LUT_{outer}(P_r))$) and which of the leftmost identified pixels has the higher mark value ($max(LUT_{inner}(P_l), LUT_{outer}(P_l))$) at S822. At S824, the length of the vehicle or object is computed using the following equation:

$$L_{object}=min(LUT_{inner}(P_r),LUT_{outer}(P_r))-max(LUT_{inner}(P_l),LUT_{outer}(P_l))$$

where $P_r$ is the rightmost pixel identified in the binary image, and $P_l$ is the leftmost pixel identified in the binary image. The identified values (which can be the mark value) can be applied to an algorithm to compute the length. For example in the instance where the LUT output value is the mark value, the length can be computed as product between the difference in mark values ($L_{object}$) and the known spacing between marks (e.g., 2-feet). In the instance where the LUT output is the actual coordinate value, the length is the difference between the maximum and minimum LUT values included in the above equation.

Figure 10:
FIG. 10 shows computed lengths for the three vehicles of FIG. 1.

FIG. 10 shows the three vehicles that were being represented by the binary image in FIG. 9 with the calculated output. For the example, the sizes of the three vehicles in FIG. 10 are shown as 11.7, 16 and 15 feet, respectively. The computed length can be applied to a thresholding or similar decision operation for determining occupancy or availability in the parking region against the known length of the parking area. The threshold can then be applied to the vehicle/object length $L_{object}$ instead of the pixel size, which is more robust to the size change caused by the image capture device's perspective.

In an alternate embodiment, using the binary image generated at S812, the length calculation module 122 determines the distance between a first object or vehicle and a second object and/or vehicle spaced apart from the first object in the parking area at S834. Returning to FIG. 9, to determine the distance "A-B" between vehicle/objects A and B, for example, the module 126 identifies pixels on or closest to the identified boundaries at S836. Embodiments are contemplated, however, where the end of the designated parking area can be treated as the second object. The module 126 identifies rightmost pixels ($P_{R-I}$)($P_{R-O}$) of a first object A on or closest to each of the inner and outer boundaries and leftmost pixels ($P_{L-1}$)($P_{L-O}$) of a second object B located next to the first object on the image plane on or closest to each of the inner and outer boundaries at S836.

The module 126 receives the first and second $LUT_{inner}$, $LUT_{outer}$ from the storage device at S818. The module 126 applies the identified pixels to the LUTs at S820. The module 126 applies the rightmost pixel ($P_{R-I}$) of the first object falling on or near the inner boundary to the first inner boundary LUT as input, and the LUT outputs the assigned mark value. Similarly, the module 126 applies the leftmost pixel ($P_{L-I}$) of the second object falling on or near the inner boundary to the first inner boundary $LUT_{inner}$ as input, and the LUT outputs the assigned mark value. Similarly, the module 126 applies the rightmost pixel ($P_{R-O}$) of the first object falling on or near the outer boundary to the second outer boundary $LUT_{outer}$ as input, and the LUT outputs the assigned mark value. Similarly, the module 126 applies the leftmost pixel ($P_{L-O}$) of the second object falling on or near the outer boundary to the second outer boundary LUT as input, and the LUT outputs the assigned mark value.

The module 126 applies the identified leftmost and rightmost pixels (to the LUTs to generate the assigned mark value as output. Using the LUTs, the module 126 determines which of the rightmost identified pixels has the lower mark value ($min(LUT_{inner}(P_r), LUT_{outer}(P_r))$) and which of the leftmost identified pixels has the higher mark value ($max (LUT_{inner}(P_l), LUT_{outer}(P_l))$) at S822. At S824, the distance between of the first and second vehicles or objects is computed using the following equation:

$$L_{object}=min(LUT_{inner}(P_r),LUT_{outer}(P_r))-max(LUT_{inner}(P_l),LUT_{outer}(P_l))$$

where $P_r$ is the rightmost pixel identified in the binary image, and $P_l$ is the leftmost pixel identified in the binary image. The identified values (which can be the mark value) are applied to an algorithm to compute the distance. For example in the instance where the LUT output value is the mark value, the distance can be computed as product between the difference in mark values ($L_{object}$) and the known spacing between marks (e.g., 2-feet). In the instance where the LUT output is the actual coordinate value, the distance is the difference between the maximum and minimum LUT coordinate output values included in the above equation. In other words, the length calculation module then accesses the LUT that is stored in the storage device to map the pixel distance to an actual distance. Generally, the pixel coordinates of (u, v) of the stationary vehicles are input into the system and used to output actual coordinates (x,y,z).

The distance value can then be used to determine an availability of the parking space, i.e., whether the parking space can be used.

With continued reference to FIG. 8, the distance calculation module 126 compares the actual distance to one of a select vehicle class and length at S846. For example, a third LUT may be used to compare the lengths of vehicles of certain classes, such as a compact car, a large sedan, a truck, and a motorcycle, etc., with the actual distance. Based on the comparison, the module 126 determines whether the actual distance is greater than the one of the vehicle class and select length. In response to the actual distance being greater than the one of the vehicle class and select length (YES at S846), the parking space is classified as being an available parking space for vehicles of the select class and length at S848. In response to the actual distance being less than the one of the vehicle class and select length (NO at S846), the parking space is classified as being an available parking space for vehicles of the select class and length at S850.

In one embodiment, the system can output the parking space availability information to a user device at S852. In one embodiment, the information can be transmitted to all vehicles that subscribe to the service and/or are determined via GPS data to be within a region proximate the parking space. In another embodiment, the information can be transmitted in response to a user-device querying the system for the information. The information can be communicated to the vehicle computer system or to a smart phone including a specialized application. The information can indicate the vehicle type that is best suited for the space based on the determined dimensions. Information can be further processed to include statistics such as a number of vehicles that can fit in the estimated available parking space. Accordingly, the output of the distance calculation module 126 is the total number of available and usable parking spaces, on a frame by frame basis, as well as locations.

The system then determines if the current frame is the last frame at S854. In response to the current frame not being the last frame in the sequence (NO at S854), the method returns to S804 to repeat the above-described process on the next frame. In response to the current frame being the last frame in the sequence (YES at S854), the method ends at S856.

In summary, FIG. 8 describes a vehicle detection process that incorporates spatial calibration information (determined at FIG. 5) into processing the video data. The spatial calibration information is associated with pixels identified in a video frame (scene) for a fixed configuration of the image capture device. The association in the discussed embodiment was made in LUTs, but embodiments contemplate that the association can be made using a camera model or a scaling function instead. The detected vehicle is resized to render the actual size using the association information (i.e., LUT). Then, the actual size information is used to set up parameters or applied toward parameters, such as a size and/or length threshold) for further processing (s.a., e.g., (tracking, monitoring, and segmentation, etc).

Although the methods 500, 600 and 800 is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

One aspect of the interpolation operation, performed as part of an on-street parking determination process, is it provides more accurate size measurements and, therefore, provides better classifications between vehicles and non-vehicle objects in terms of size.

Another aspect of the calibration operation is that it provides better tracking and monitoring of objects positioned farther away from the image capture device, especially in instances where objects closer to the image capture device partially or completely occlude larger objects located farther from the image capture device. In other words, the output is less prone to noise fluctuation in the video sequence.

Another aspect of the disclosure is that the output, in the form of the, the estimated length of the object of interest on the image plane, can be useful either to reduce the computational complexity (e.g., in performing a window search across the image for object detection) or to increase the detection performance (e.g., eliminating some false positives).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining parking availability, the method comprising:
   receiving video data from a sequence of frames taken from an associated image capture device monitoring a parking area;
   detecting at least one object located in the parking area;
   determining boundaries of the parking area, the boundaries including at least an inner boundary relative to the associated image capture device and an outer boundary relative to the associated image capture device, the outer boundary being substantially parallel to the inner boundary;
   identifying a leftmost object pixel and one of a rightmost object pixel and rightmost second object pixel on or closest to each of the inner and outer boundaries;
   computing a length of at least one of the object and a space between objects using the identified pixels and first and second LUTs corresponding to the inner and outer boundaries;
   using the computed length, determining a parking availability in the parking area; and,
   outputting a notice of the parking availability to a user.

2. The method of claim 1, wherein the parking area includes an on-street parking lane and the inner and outer boundaries extend along the parking lane.

3. The method of claim 1 further comprising:
   before detecting the at least one object, receive video data capturing equally spaced apart markings defining actual boundaries in the parking area, the markings including a first set of inner marks and a second set of outer marks located along opposite edges defining the parking area, the first and second sets of marks being oriented in a substantial parallel relationship;

capturing the parking area with the markings using the associated image capture device;

mapping coordinates of each marking onto the image plane;

associating a pixel value with the each marking;

generating the first LUT corresponding to the pixels associated with the first set of inner marks and the second LUT corresponding to the pixels associated with the second set of the outer marks, the first and second LUTs assigning each pixel to an assigned value such that a spaced apart pair of pixels is known to be of certain distance along the actual boundaries; and, removing the markings in the parking area before receiving the video data.

4. The method of claim 1, wherein the detecting the at least one object includes:

classifying pixels in each frame as belonging to one of a background image and a foreground image using background estimation;

generating a binary image using the classified pixels; and, for a current frame, associating each binary image on the image plane with an object.

5. The method of claim 4, wherein the computing the length includes:

identifying leftmost pixels of the object on the image plane on or closest to each of the outer and inner boundaries and rightmost pixels of the object on the image plane closest to each of the outer and inner boundaries;

receiving the first LUT corresponding to the inner boundary and the second LUT corresponding to the outer boundary, the first and second LUTs mapping the identified pixels to an assigned value; and, computing a length of the object with the equation:

$$L_{object}=\min(LUT_{inner}(P_r),LUT_{outer}(P_r))-\max(LUT_{inner}(P_l),LUT_{outer}(P_l)),$$

where $P_r$ is the rightmost pixel identified in the binary image, and $P_l$ is the leftmost pixel identified in the binary image.

6. The method of claim 5 wherein the determining the parking availability includes:

determining a remaining length of space available in the parking using the computed length of the object;

comparing the remaining length to a threshold; and, in response to the remaining length being greater than the threshold, classifying the parking area as having available space.

7. The method of claim 4, wherein the computing the length includes:

identifying rightmost pixels of a first object located closest to the associated image capture device on the image plane on or closest to each of the inner and outer boundaries;

identifying leftmost pixels of a second object located next to the first object and farther away from the associated image capture device on the image plane on or closest to each of the inner and outer boundaries; and, calculating the length of a space between the objects based on the identified pixels.

8. The method of claim 7, wherein the calculating the length of the space between two objects includes:

receiving the first LUT corresponding to the inner boundary and the second LUT corresponding to the outer boundary, the first and second LUTs mapping pixel values with actual coordinates; and, computing the length of the space with the equation:

$$L_{space}=\min(LUT_{inner}(P_r),LUT_{outer}(P_r))-\max(LUT_{inner}(P_l),LUT_{outer}(P_l)),$$

where $P_r$ is the rightmost pixel identified in the binary image, and $P_l$ is the leftmost pixel identified in the binary image.

9. The method of claim 1, wherein the determining a parking availability includes:

comparing the length between the two objects to a threshold associated with one of a vehicle class and select length;

in response to the length being greater than the threshold, classifying the space as an available parking space for the one of the vehicle class and select length.

10. A computer program product comprising tangible media which encodes instructions for performing the method of claim 1.

11. A system for determining parking availability, the system comprising:

a parking space determination device, the parking space determination device including:

a video buffer module operable to receive video data from a sequence of frames capturing a parking area;

a vehicle detection module operable to detect at least one object located in the parking area;

a length calculation module operable to:

determine boundaries of the parking area, the boundaries including at least an inner boundary relative to an associated image capture device and an outer boundary relative to the associated image capture device, the outer boundary being substantially parallel to the inner boundary, identify a leftmost object pixel and one of a rightmost object pixel and rightmost second object pixel on or closest to each of the inner and outer boundaries, and compute a length of at least one of the object and a space between objects using the identified pixels and first and second LUTs corresponding the inner and outer boundaries;

a parking determination module operable to determine a parking availability in the parking area using the computed length;

a communication interface operable to transmit a notice of the parking availability to a user; and, a processor operable to execute the modules.

12. The system of claim 11, wherein the parking area includes an on-street parking lane and the inner and outer boundaries extend along the parking lane.

13. The system of claim 11 further comprising a calibration module operable to:

before detecting the at least one object, receive video data capturing equally spaced apart markings defining actual boundaries in the parking area, the markings including a first set of inner marks and a second set of outer marks located along opposite edges defining the parking area, the first and second sets of marks being oriented in a substantial parallel relationship;

map coordinates of each marking onto the image plane;

associate a pixel value with the each marking;

generate the first LUT corresponding to the pixels associated with the first set of inner marks and the second LUT corresponding to the pixels associated with the second set of the outer marks, the first and second LUTs assigning each pixel to an assigned value such that a spaced apart pair of pixels is known to be of certain distance along the actual boundaries; and, remove the markings in the parking area before receiving the video data.

14. The system of claim 11, wherein the vehicle detection module is operable to:

classify pixels in each frame as belonging to one of a background image and a foreground image using background estimation;

generate a binary image using the classified pixels; and, for a current frame, associate each binary image on the image plane with an object.

15. The system of claim 14, wherein the length calculation module is operable to:

identify leftmost pixels of the object on the image plane on or closest to each of the outer and inner boundaries and rightmost pixels of the object on the image plane closest to each of the outer and inner boundaries;

receive the first LUT corresponding to the inner boundary and the second LUT corresponding to the outer boundary, the first and second LUTs mapping the identified pixels to an assigned value; and, compute a length of the object with the equation:

$$L_{object} = \min(LUT_{inner}(P_r), LUT_{outer}(P_r)) - \max(LUT_{inner}(P_l), LUT_{outer}(P_l)),$$

where $P_r$ is the rightmost pixel identified in the binary image, and $P_l$ is the leftmost pixel identified in the binary image.

16. The system of claim 15 wherein the parking determination module is operable to:

determine a remaining length of space available in the parking using the computed length of the object;

compare the remaining length to a threshold; and, in response to the remaining length being greater than the threshold, classify the parking area as having available space.

17. The system of claim 14, wherein the length calculation module is operable to:

identify rightmost pixels of a first object located closest to the associated image capture device on the image plane on or closest to each of the inner and outer boundaries;

identify leftmost pixels of a second object located next to the first object and farther away from the associated image capture device on the image plane on or closest to each of the inner and outer boundaries; and, calculate the length of a space between the objects based on the identified pixels.

18. The system of claim 17, wherein the length calculation module is operable to:

receive the first LUT corresponding to the inner boundary and the second LUT corresponding to the outer boundary, the first and second LUTs mapping pixel values with actual coordinates; and, compute the length of the space with the equation:

$$L_{space} = \min(LUT_{inner}(P_r), LUT_{outer}(P_r)) - \max(LUT_{inner}(P_l), LUT_{outer}(P_l)),$$

where $P_r$ is the rightmost pixel identified in the binary image, and $P_l$ is the leftmost pixel identified in the binary image.

19. The system of claim 11, wherein the a parking determination module is operable to:

compare the length between the two objects to a threshold associated with one of a vehicle class and select length;

in response to the length being greater than the threshold, classify the space as an available parking space for the one of the vehicle class and select length.

20. The system of claim 11 further comprising an image capture device.

* * * * *